United States Patent
Ozawa

(10) Patent No.: US 9,710,196 B2
(45) Date of Patent: Jul. 18, 2017

(54) METHOD OF STORING DATA, STORAGE SYSTEM, AND STORAGE APPARATUS

(71) Applicant: FUJITSU LIMITED, Kawasaki-shi, Kanagawa (JP)

(72) Inventor: Toshihiro Ozawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 26 days.

(21) Appl. No.: 14/603,467

(22) Filed: Jan. 23, 2015

(65) Prior Publication Data

US 2015/0234619 A1 Aug. 20, 2015

(30) Foreign Application Priority Data

Feb. 20, 2014 (JP) .................................. 2014-030222

(51) Int. Cl.
*G06F 3/06* (2006.01)
(52) U.S. Cl.
CPC .............. *G06F 3/067* (2013.01); *G06F 3/065* (2013.01); *G06F 3/0617* (2013.01)
(58) Field of Classification Search
CPC ...... G06F 3/0655; G06F 3/0608; G06F 3/067; G06F 3/0689; G06F 17/30194; G06F 17/30575; G06F 11/1076; G06F 11/2089
See application file for complete search history.

(56) References Cited

U.S. PATENT DOCUMENTS

| | | | | |
|---|---|---|---|---|
| 2001/0027486 A1* | 10/2001 | Takamoto | ............. | H04L 1/1809 709/227 |
| 2001/0050915 A1* | 12/2001 | O'Hare | ................. | G06F 3/0605 370/400 |
| 2002/0018467 A1* | 2/2002 | Rajan | ...................... | H04L 29/06 370/389 |
| 2002/0030611 A1* | 3/2002 | Nuesser | ................. | G08G 1/092 340/992 |
| 2005/0256972 A1* | 11/2005 | Cochran | ............... | H04L 69/329 709/245 |
| 2008/0031136 A1* | 2/2008 | Gavette | ................... | H04L 12/66 370/235 |
| 2010/0023655 A1 | 1/2010 | Hirayama | | |
| 2013/0166773 A1* | 6/2013 | Armstrong | .......... | H04L 12/4641 709/234 |
| 2014/0359229 A1* | 12/2014 | Cota-Robles | ........... | G06F 9/455 711/143 |

FOREIGN PATENT DOCUMENTS

| | | |
|---|---|---|
| JP | 2004-133598 | 4/2004 |
| JP | 2005-327283 | 11/2005 |
| JP | 2010-33125 | 2/2010 |

* cited by examiner

*Primary Examiner* — Idriss N Alrobaye
*Assistant Examiner* — Ronald Modo
(74) *Attorney, Agent, or Firm* — Staas & Halsey LLP

(57) ABSTRACT

A method of storing data using a first storage apparatus, a second storage apparatus, and a third storage apparatus coupled with each other through a network, includes as followings. The first storage apparatus receives a processing request of first data and second data. The first storage apparatus includes the first data as data to be addressed to the second storage apparatus, and the second data as data to be addressed to the third storage apparatus in one packet. The first storage apparatus transmits the one packet to the second storage apparatus. After transmitting the first data and the second data, the second storage apparatus transmits the second data to the third storage apparatus.

20 Claims, 15 Drawing Sheets

FIG. 6

| THE FIRST DIGIT OF HASH VALUE | MASTER NODE |
|---|---|
| 0~2 | STORAGE APPARATUS 100A |
| 3~5 | STORAGE APPARATUS 100B |
| 6~9 | STORAGE APPARATUS 100C |
| THE SECOND DIGIT OF HASH VALUE | SLAVE NODE |
| 0~2 | STORAGE APPARATUS 100A |
| 3~5 | STORAGE APPARATUS 100B |
| 6~9 | STORAGE APPARATUS 100C |

FIG. 7

| DESTINATION ADDRESS | DATA ID | DATA (PAYLOAD) |

FIG. 10

| REPLICATION ID | TRANSMISSION DESTINATION ADDRESS | DATA ID |
|---|---|---|
| aa | B (STORAGE APPARATUS 100B) | X |
| bb | B (STORAGE APPARATUS 100B) | Y,Z |
| ⋮ | ⋮ | ⋮ |

FIG. 14

| MOVE PROCESSING ID | DESTINATION ADDRESS | DATA ID |
|---|---|---|
| pp | C (STORAGE APPARATUS 100C) | Z |
| ⋮ | ⋮ | ⋮ |

METHOD OF STORING DATA, STORAGE SYSTEM, AND STORAGE APPARATUS

CROSS-REFERENCE TO RELATED APPLICATION

This application is based upon and claims the benefit of priority of the prior Japanese Patent Application No. 2014-030222, filed on Feb. 20, 2014, the entire contents of which are incorporated herein by reference.

FIELD

The embodiments discussed herein are related to a method of storing data, a storage system, and a storage apparatus.

BACKGROUND

Storage systems in which a plurality of storage apparatuses redundantly store the same data are being developed as storage systems for storing data in order to avoid loss of stored data. For example, when a user accesses a specific server through the Internet, and writes data, the written data is stored in a certain storage apparatus, and further, the same data (replication data) as the data stored in the storage apparatus is also stored in another storage apparatus. In this manner, by a plurality of storage apparatuses holding the same data, even if it is not possible to read data from one of the storage apparatuses, because the data is mistakenly deleted in the one of the storage apparatuses, or a failure occurs in the one of the storage apparatuses, it is possible to read the data by accessing the other storage apparatuses. Holding the same data in a plurality of storage apparatus is called replication.

It is thought that replication is achieved by a method in which first, one storage apparatus writes data, further, that storage apparatus transmits the replication data of that data to another storage apparatus, and the other storage apparatus stores the replication data. In this case, if communication congestion occurs in a network coupling two storage apparatuses, data transfer between the storage apparatuses sometimes takes long time. Also, if transmission is performed individually for a plurality of pieces of replication data, the number of data transmissions increases. This causes communication congestion in the network, and further causes a delay in the data transfer. Concerning this problem, it is known that there is a method in which a plurality of pieces of data are put together, and are transmitted between the storage apparatuses so that the number of communications is reduced. As a result of using this method, the processor load of the storage apparatus for performing communication processing is reduced, the communication load of the network is reduced, and thus time occupied for storing replication data is also shortened. Japanese Laid-open Patent Publication No. 2004-133598 is given as one of related-art technical documents.

SUMMARY

According to an aspect of the invention, a method of storing data using a first storage apparatus, a second storage apparatus, and a third storage apparatus coupled with each other through a network, includes as follows. The first storage apparatus receives a processing request of first data and second data. The first storage apparatus includes the first data as data to be addressed to the second storage apparatus, and the second data as data to be addressed to the third storage apparatus in one packet. The first storage apparatus transmits the one packet to the second storage apparatus. After transmitting the first data and the second data the second storage apparatus transmits the second data to the third storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a table illustrating a corresponding relationship between a hash value of a data ID and a storage apparatus of a data storage destination;

FIG. 7 is a diagram illustrating a data structure to be transmitted according to the embodiment;

FIG. 10 is an example of a replication list according to the embodiment;

FIG. 14 is an example of a movement list according to the embodiment; and

DESCRIPTION OF EMBODIMENTS

Figure 1:
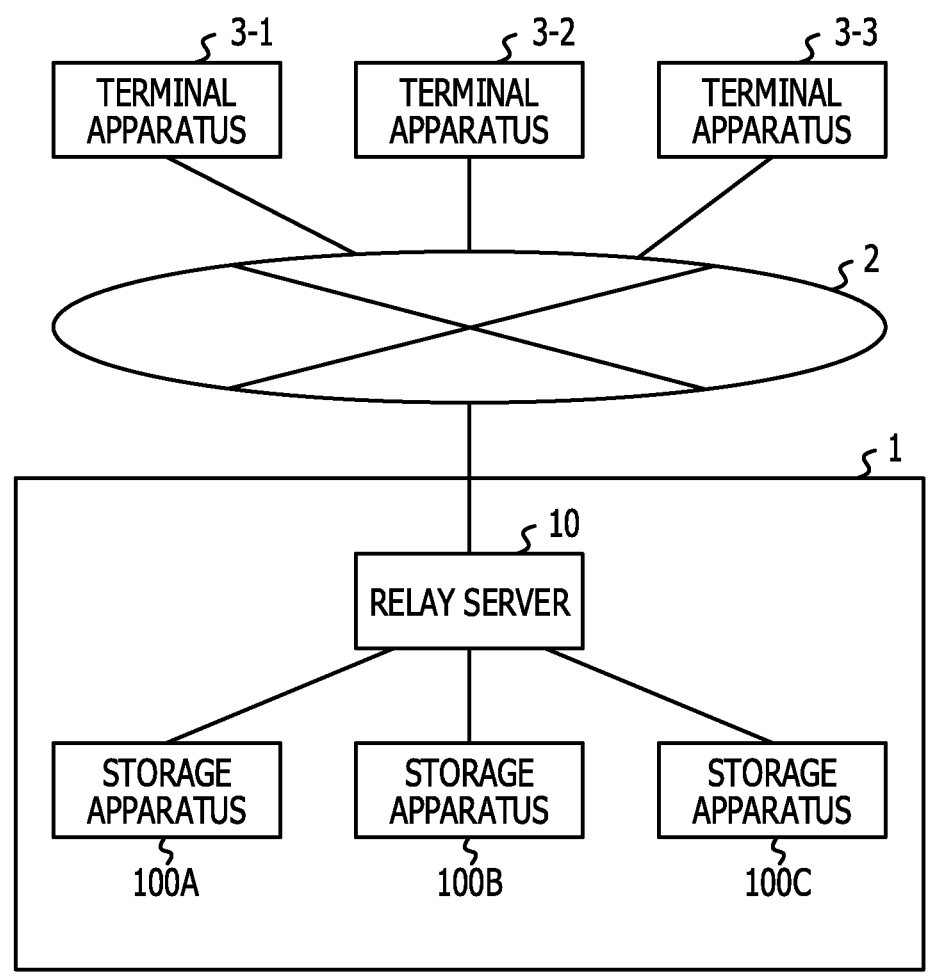
FIG. 1 is a configuration diagram of a storage system according to an embodiment.

Japanese Laid-open Patent Publication No. 2004-133598 has disclosed a method of transmitting a plurality of pieces of replication data together in a storage system in which one storage apparatus that transmits replication data is provided, and only one storage apparatus that receives the replication data is provided. However, Japanese Laid-open Patent Publication No. 2004-133598 has disclosed nothing on the case of using a storage system in which a plurality of storage apparatuses capable of storing replication data are provided, and how the replication processing is to be performed among the plurality of storage apparatuses. For example, an assumption is made of a storage system in which first data is stored in a first storage apparatus, and the replication data of the first data is stored in a second storage apparatus, at the same time, second data is stored in the first storage apparatus, and the replication data of the second data is stored in a third storage apparatus. In the case of using such a storage system, Japanese Laid-open Patent Publication No. 2004-133598 has disclosed nothing on the point of how to apply a method of transferring a plurality of pieces of replication data together. Accordingly, it is difficult to say that the method described in Japanese Laid-open Patent Publication No. 2004-133598 is sufficiently convenient.

In the present specification, a storage apparatus that stores data upon receiving a data write request is referred to as a "master node", and data that is identical to the data stored in the master node and is stored in another storage apparatus in order to avoid data loss is referred to as "replication data". Also, the other storage apparatus that stores the replication data is referred to as a "slave node".

Prior to a description of embodiments, a description will be given of the problems, which was found by the inventor of the application concerned, that occurs when a plurality of replication data is transmitted from a master node to slave nodes in a storage system including a plurality of storage apparatuses being potential slave nodes. For example, it is assumed that a write request of first data and second data was made to a master node. It is assumed that the replication data of the first data is to be stored into a first slave node, and the replication data of the second data is to be stored into a second slave node. In the case where a communication load is high in a network between storage apparatuses, if communication is performed by handling a plurality of replication data as individual packets, the communication load in the network might be further increased. Accordingly, as described in Japanese Laid-open Patent Publication No. 2004-133598, it is assumed that two pieces of replication data are put together into one packet in order to reduce the number of communications, and the packet is transmitted to the first slave node. In this case, the replication data of the second data is not stored in the second slave node, where the replication data is supposed to be stored originally, but is stored in the first slave node. In this case, the second data, and the replication data thereof are stored in the different storage apparatuses with each other, and thus it is possible to increase reliability against data loss. However, if a read request is issued for the second data, the data is sometimes unable to be read by accessing the second slave node, because the desired data is not stored in the second slave node, where the replication data of the second data is supposed to be stored originally. In order to solve this problem, a storage management method is thought in which a change in a storage destination of the replication data of the second data from the second slave node to the first slave node is stored in a system for each data based on a data ID, for example. However, it is difficult to implement such a management method in a field of cloud computing, where vast amount of data is processed, or the like.

The present disclosure is made in order to solve the above-described problem. In the present disclosure, in a state in which a communication load of the network is higher than a predetermined value, a plurality of pieces of the replication data are put together, and are transmitted from a master node to a specific slave node to be stored. Thereby, it is possible to reduce the number of communications, and to reduce the communication load of the network and the processing load of the processor of the master node that performs communication processing. Also, it is possible to store data into a plurality of storage apparatuses so as to improve reliability against data loss, or the like. Further, the slave node extracts the replication data to be originally stored into the other slave node among the replication data stored by the slave node itself, and transfers that replication data to the other slave node in a state in which the communication load of the network becomes a predetermined value or less. In this manner, by moving the replication data to the slave node to which the replication data is supposed to be stored, it becomes possible to access the data if a read request of the data is issued.

FIG. 1 is a configuration diagram of an entire network including a storage system 1. A plurality of client terminal apparatuses 3-1, 3-2, and 3-3 (hereinafter, in the case of not indicating a specific terminal apparatus, simply described as a "terminal apparatus 3") are coupled to a network 2, and the terminal apparatus 3 issues a data write request and a data read request to the storage system 1.

The storage system 1 includes a relay server 10, and storage apparatuses 100A, 100B, 100C (hereinafter, in the case of not indicating a specific storage apparatus, simply described as a "storage apparatus 100") that are coupled to the relay server 10. The relay server 10 is coupled to the network 2, and receives write data transmitted from the terminal apparatus 3. The relay server 10 is a gateway, a proxy server, and the like, for example. The relay server 10 functions as a load balancer. The relay server 10 specifies a storage apparatus 100 to be a master node for storing the data for each received write data, and a storage apparatus 100 to be a slave node for storing the replication data of that data. A description has been given later of the method of specifying a master node and a slave node. If the relay server 10 specifies that the storage place of the data received from the terminal apparatus 3 is the storage apparatus 100A, and the storage place of the replication data is the storage apparatus 100B, the relay server 10 transmits the data to the storage apparatus 100A, which is the master node. The storage apparatus 100A transmits the replication data of the received data to the storage apparatus 100B, which is the slave node.

Figure 2:
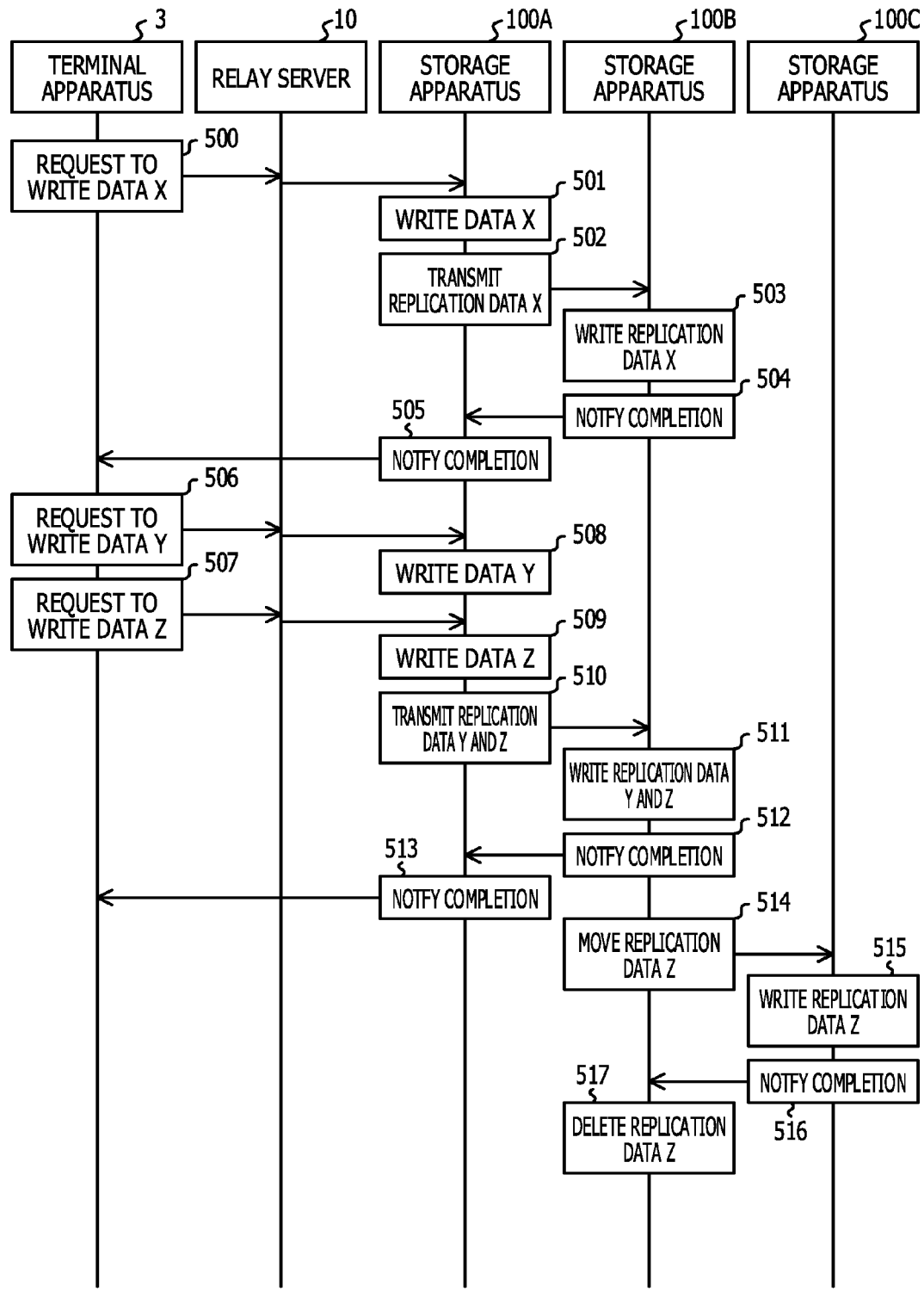
FIG. 2 is a diagram illustrating an operation procedure of the storage system according to the embodiment.

A description will be given of a flow of the overall processing of the storage system 1 using FIG. 2. Processing 500 to processing 505 describes the case of transmitting individual replication data from the master node to the slave node. in processing 500, the terminal apparatus 3 issues a write request of data whose data ID is "X" (hereinafter, describes as data X). It is assumed that the data X specifies that the storage apparatus 100A is a master node, and the storage apparatus 100B is a slave node. The data X is transferred by the relay server 10 to the storage apparatus 100A, which is the master node. In processing 501, the storage apparatus 100A writes the received data X into the data storage unit held by the storage apparatus 100A. Further, in processing 502, the storage apparatus 100A transmits the replication data of the data X (assumed to have the same contents as the original data, and have the same data ID "X" as the data ID of the original data, hereinafter described as replication data X) to the storage apparatus 100B, which is the slave node. In processing 503, the storage apparatus 100B stores the received replication data X into the data storage unit held by the storage apparatus 100B, and the replication operation is completed. After that, in processing 504, the storage apparatus 100B, which is the slave node, notifies the completion of writing the replication data X to the storage apparatus 100A, which is the master node. In processing 505, the storage apparatus 100A notifies the completion of writing the data X to the terminal apparatus 3, which issued the write request, based on the completion notification from the storage apparatus 100B, and a series of operation is completed.

Next, a description will be given of the case of putting a plurality of replication data together, and transmitting the data to the specific storage apparatus 100 based on processing 506 to processing 517 in FIG. 2. In processing 506, the terminal apparatus 3 issues a write request of data Y. It is assumed that the data Y specifies that the storage apparatus 100A is a master node, and the storage apparatus 100B is a slave node. Also, in processing 507, the terminal apparatus 3 issues a write request of data Z. It is assumed that the data Z specifies that the storage apparatus 100A is a master node, and the storage apparatus 100C is a slave node. Both the data Y and the data Z are transferred by the relay server 10 to the storage apparatus 100A, which is the master node. In processing 508, the storage apparatus 100A writes the received data Y into the data storage unit held by the storage apparatus 100A. Also, in processing 508, the storage apparatus 100A writes the received data Z into the data storage unit held by the storage apparatus 100A. Here, if a predetermined condition described later is met, in processing 510, the storage apparatus 100A puts the replication data Y and the replication data Z together into one packet, and transmits the packet to the storage apparatus 100B. "Putting the replication data Y and the replication data Z together into one packet" means including the replication data Y and the replication data Z into a payload unit of a single packet having a single destination address. In processing 511, the storage apparatus 100B stores the two pieces of the received replication data into the data storage unit held by the storage apparatus 100B. After that, in processing 512, the storage apparatus 100B notifies the completion of writing the two pieces of the received replication data to the storage apparatus 100A. In processing 513, the storage apparatus 100A notifies the completion of writing the data Y and the data Z to the terminal apparatus 3 based on the completion notification from the storage apparatus 100B.

The replication data Z is originally to be stored into the storage apparatus 100C, and thus the storage 100B is not a right slave node for storing the replication data Z. Thus, in processing 514, if the predetermined condition described later is met, the storage apparatus 100B moves (transmits) the replication data of the data Z to the storage apparatus 100C, which is the original storage destination. In processing 515, the storage apparatus 100C writes the replication data Z into the data storage unit held by the storage apparatus 100C. In processing 516, the storage apparatus 100C notifies the write completion to the storage apparatus 100B. The storage apparatus 100B deletes the replication data Z from the data storage unit held by the storage apparatus 100B as occasion calls.

Figure 3:
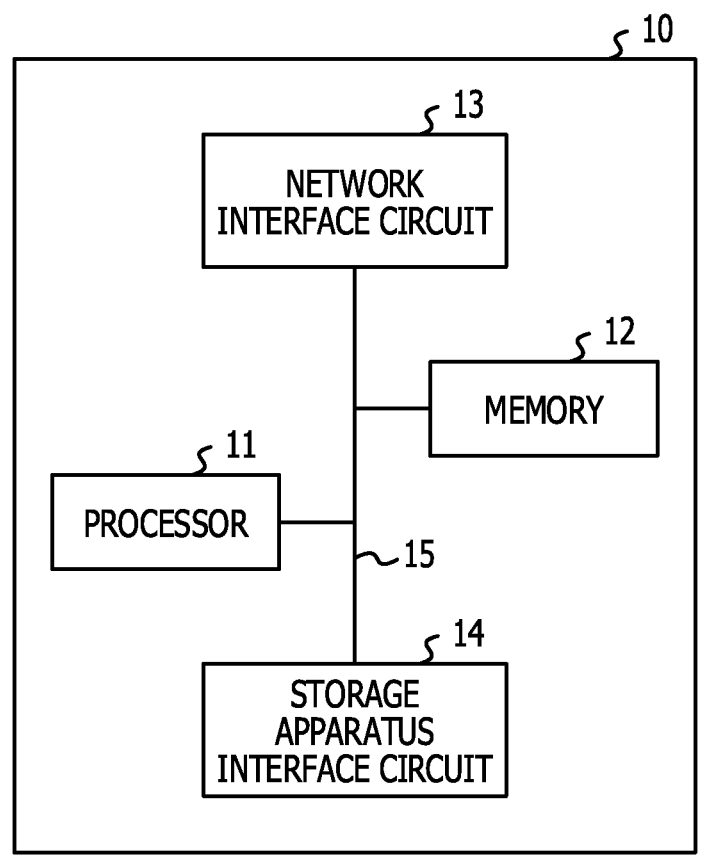
FIG. 3 is a hardware configuration diagram of a relay server according to the embodiment.

FIG. 3 is a diagram illustrating a hardware configuration of the relay server 10. The relay server 10 includes a bus 15, a processor 11, a memory 12, a network interface circuit 13, and a storage apparatus interface circuit 14, which are coupled with each other through the bus 15.

Figure 4:
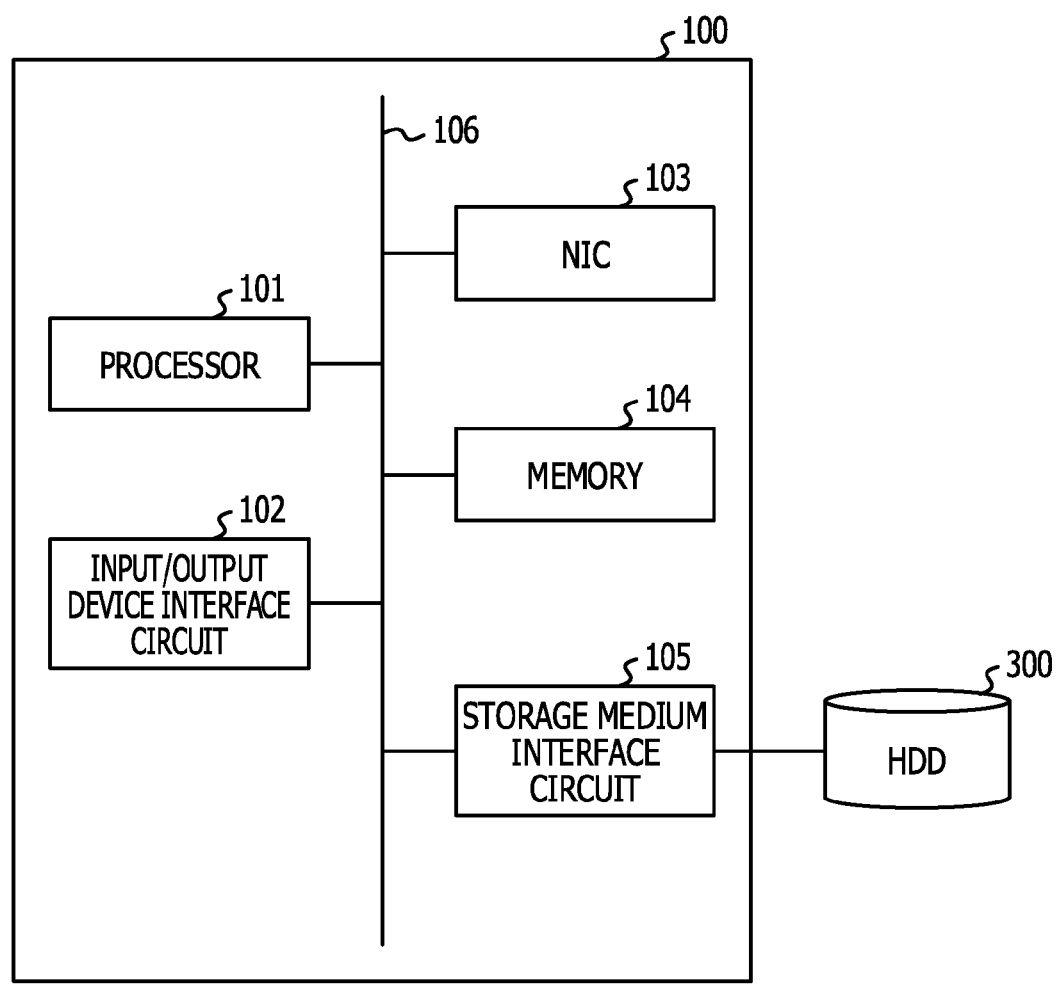
FIG. 4 is a hardware configuration diagram of a storage apparatus according to the embodiment.

FIG. 4 is a diagram illustrating a hardware configuration of a storage apparatus 100. It is possible to apply a configuration of the storage apparatus 100 disclosed here to any one of the storage apparatus 100A, the storage apparatus 100B, and the storage apparatus 100C. The storage apparatus 100 includes a processor 101, an input/output device interface circuit 102, an NIC 103, a memory 104, a storage medium interface circuit 105, and a bus 106 coupling these together. The storage medium interface circuit 105 is coupled to a hard disk drive (HDD) 300. The HDD 300 is an example of the data storage unit. The data storage unit may be disposed inside or outside of the storage apparatus 100.

In this regard, the processor 11 and the 101 illustrated in FIG. 3 and FIG. 4, respectively, are electronic circuit parts, such as a central processing unit (CPU), a micro-processing unit (MPU), a digital signal processor (DSP), a field-programmable gate array (FPGA), or the like. Also, the memory 12 and the 104 are electronic circuit parts, such as a dynamic random access memory (DRAM), a static random access memory (SRAM), a flash memory, or the like.

Figure 5:
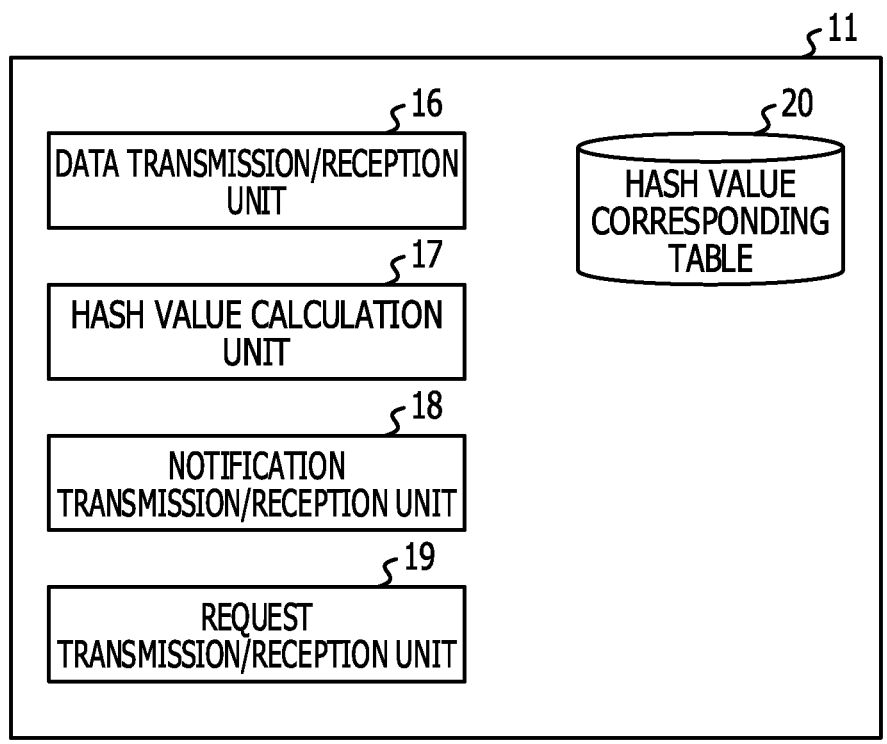
FIG. 5 is a functional block diagram of the relay server according to the embodiment.

FIG. 5 is a functional block diagram of the processor 11 held by the relay server 10. The processor 11 executes a predetermined program stored in the memory 12 or another memory accessible by the relay server 10 so as to achieve the functions of the individual blocks illustrated in FIG. 5. The processor 11 functions as a data transmission/reception unit 16, a hash value calculation unit 17, a notification transmission/reception unit 18, and a request transmission/reception unit 19. Also, the processor 11 holds a hash value corresponding table 20.

The data transmission/reception unit 16 receives write data transmitted from the terminal apparatus 3 to the storage system 1, and transmits the write data to the storage apparatus 100. Also, if the terminal apparatus 3 issues a read request of the data stored in the storage system 1, the data transmission/reception unit 16 transmits the data read from the storage apparatus 100 to the terminal apparatus 3.

The hash value calculation unit 17 calculates a hash value for the data name (data ID) attached to the write data. The hash value is used for identifying which storage apparatus 100 stores the data, and also which storage apparatus 100 stores the replication data of that data. The hash value corresponding table 20 is a corresponding table referenced at the time of identifying a master node and a slave node based on the calculated hash value. There are various methods for determining a master node and a slave node based on the hash value. One of the examples is illustrated in FIG. 6.

The example illustrated in FIG. 6 specifies that if the lowest digit (the first digit) of the hash value is any one of "0", "1", and "2", the storage apparatus 100A is determined to be a master node, if the lowest digit is any one of "3", "4", and "5", the storage apparatus 100B is determined to be a master node, and if the lowest digit is any one of "6", "7", "8", and "9", the storage apparatus 100C is determined to be a master node. Also, if the second lowest digit (the second digit) of the hash value is any one of "0", "1", and "2", the storage apparatus 100A is determined to be a slave node, if the second lowest digit is any one of "3", "4", and "5", the storage apparatus 100B is determined to be a slave node, and if the second lowest digit is any one of "6", "7", "8", and "9", the storage apparatus 100C is determined to be a slave node. In this regard, if the lowest two digits of the hash value is "00", for example, and thus both the master node and the slave node are determined to be the storage apparatus 100A, it is not possible to achieve replication. Accordingly, in such a case, a specification is made such that the storage apparatus 100B, which is different from the master node, is selected as the slave node, for example. In this regard, the specification described here is only one example, and thus a master node and a slave node may be determined not only by a method based on a hash value, but also by any other specifications.

Referring back to description of FIG. 5, the notification transmission/reception unit 18 notifies a write completion to the terminal apparatus 3 that has issued a write request at a point in time when the data is stored into the storage apparatus 100, which is the master node, and also the replication data is stored into the other storage apparatus 100. As described later, this write completion notification is issued at the time when the replication data is stored into a storage apparatus 100 and the replication data is stored into the other storage apparatus 100, even if the replication data is temporarily stored into a storage apparatus 100 that is different from a right slave node specified in the hash value corresponding table 20.

The request transmission/reception unit 19 receives a data read request from the terminal apparatus 3. Also, the request transmission/reception unit 19 identifies which storage apparatus 100 stores the data based on the hash value of the data ID of the data demanded by the received data read request, and transfers the data read request to the identified storage apparatus 100. In this regard, a data read request may be transferred to a master node, and may also be transferred to a slave node.

In this regard, the processor 11 does not have to include all the functions illustrated in FIG. 5. For example, the hash value calculation unit 17 may be disposed as a dedicated logic circuit separately from the processor 11. Also, the hash value corresponding table 20 may be stored in the memory 12.

Figure 7:
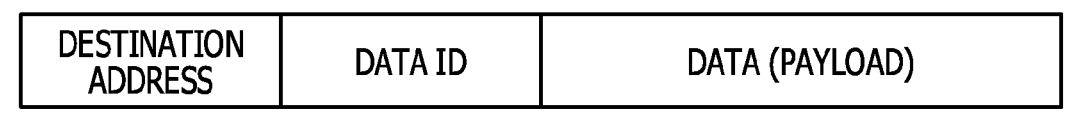

FIG. 7 is a diagram illustrating a format of a packet transmitted from the relay server 10 to the storage apparatus 100. A packet transmitted from the terminal apparatus 3 includes a data ID, and a data body (payload). The relay server 10 identifies the storage apparatus 100 to be a master node and a slave node based on the data ID, and adds a destination address having the identified storage apparatus 100 as a destination to the packet as a header or a tailer, and transfers the packet.

Figure 8:
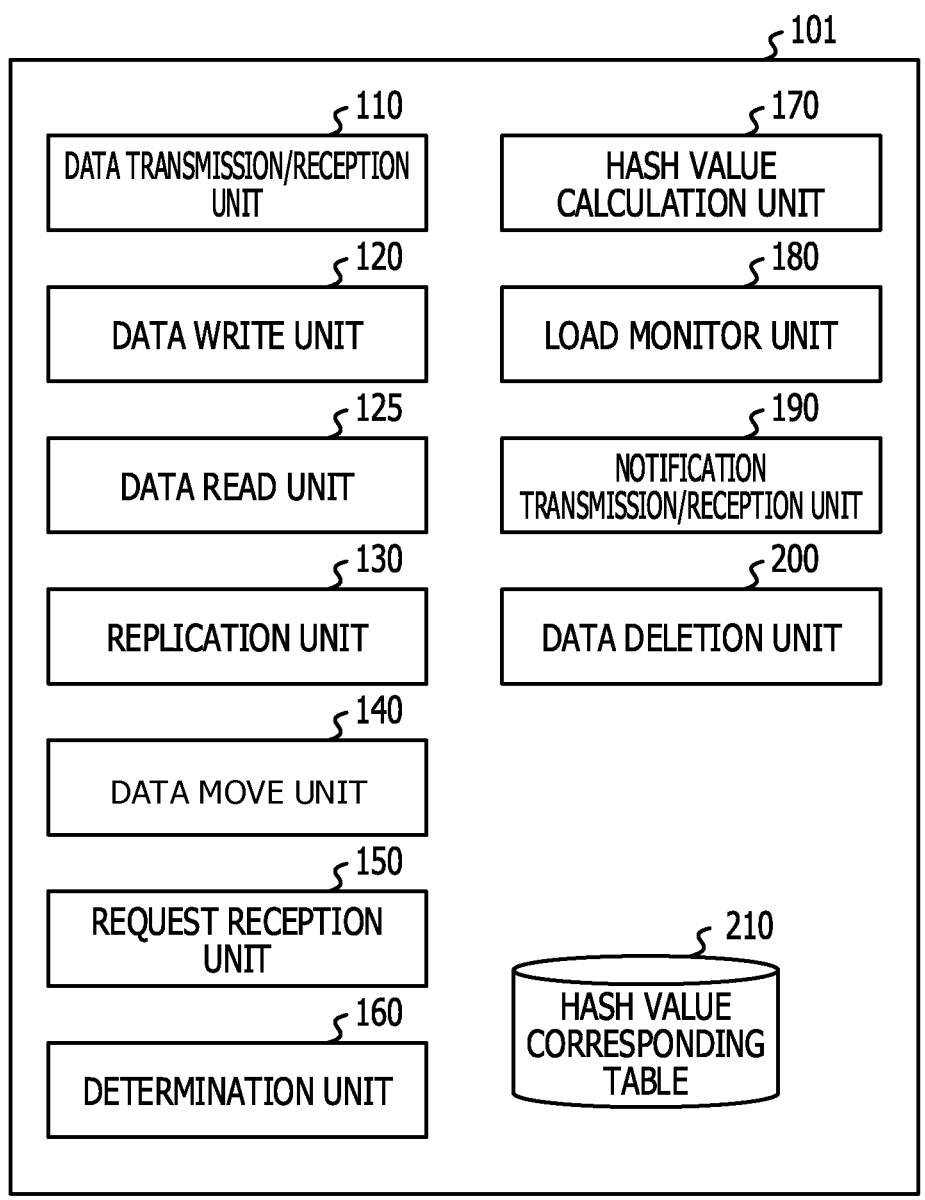
FIG. 8 is a functional block diagram of the storage apparatus according to the embodiment.

FIG. 8 is a functional block diagram of the processor 101 held by the storage apparatus 100. The processor 101 executes a predetermined program stored in the memory 104 or another memory accessible by the processor 101 so as to achieve the functions of the individual blocks illustrated in FIG. 8. The processor 101 functions as a data transmission/reception unit 110, a data write unit 120, a data read unit 125, a replication unit 130, a data move unit 140, a request reception unit 150, a determination unit 160, a hash value calculation unit 170, a load monitor unit 180, a notification transmission/reception unit 190, and a data deletion unit 200. Also, the storage apparatus 100 holds a hash value corresponding table 210 having the same contents as those of the hash value corresponding table 20 held by the relay server 10, which is illustrated in FIG. 6. In this regard, the processor 101 does not have to include all the functions illustrated in FIG. 8. For example, the hash value calculation unit 170 and the load monitor 180 may be disposed separately from the processor 101 as dedicated logic circuits. Also, the hash value corresponding table 210 may be stored in the memory 104.

The data transmission/reception unit 110 receives write data transmitted from the terminal apparatus 3 through the relay server 10. Also, if the data transmission/reception unit 110 receives a data read request issued from the terminal apparatus 3, the data transmission/reception unit 110 transmits the data stored in the data storage unit, such as the HDD 300 or the like, to the terminal apparatus 3.

The data write unit 120 writes the data received from the terminal apparatus 3 into a data storage unit, such as the HDD 300, or the like. Also, the data write unit 120 stores the replication data transmitted from the master node, or the replication data transmitted from the storage apparatus 100, which is not a right slave node, into the data storage unit. In the present embodiment, when the data write unit 120 receives data, the data write unit 120 may perform write processing without checking which storage apparatus 100 the received data is addressed to. For example, even if the data is the replication data that has been transmitted from the storage apparatus 100, which is the master node, and the storage apparatus 100 that received the replication data is not the right slave node of the replication data, the storage apparatus 100 stores the replication data into the data storage unit of that storage apparatus 100.

When the data read unit 125 receives a data read request from the terminal apparatus 3, the data read unit 125 reads the data from the data storage unit, such as the HDD 300 or the like. If the storage apparatus 100 is a master node, the replication unit 130 performs replication by transmitting the replication data of the received data to the storage apparatus 100 to be a slave node.

If received replication data is data having another storage apparatus 100 as a right slave node, the data move unit 140 moves the replication data to the right storage apparatus 100. That is to say, if a predetermined condition is met, the data move unit 140 of the storage apparatus 100 that has received a packet including replication data having the own storage apparatus 100 as a destination, and replication data having another storage apparatus 100 as a destination transmits the relevant replication data to the other storage apparatus 100.

The request reception unit 150 receives a data read request from the terminal apparatus 3, for example. The determination unit 160 makes a determination demanded in the processing performed by the replication unit 130 and the data move unit 140.

The hash value calculation unit 170 calculates a hash value for the data ID of write data. The load monitor unit 180 monitors the communication load of the network. For example, the load monitor unit 180 calculates the number of packets communicated on the network per unit time, or the response time of the Ping command transmitted and received between the own storage apparatus 100 and another storage apparatus 100, or the like. The Ping command is a command for issuing a specific packet to a target node with which network communication is to be confirmed, and checking whether the packet correctly reaches or not, and a reply is obtained.

The notification transmission/reception unit 190 performs transmission and reception of a completion notification, which is carried out at a time when data write is completed between the other storage apparatus 100 and the terminal apparatus 3, and the like. For example, if the storage apparatus 100 is a master node, when the master node completes storing data, and a slave node completes storing the replication data, the notification transmission/reception unit 190 notifies a write completion to the terminal apparatus 3. Also, the notification transmission/reception unit 190 receives a notification from the slave node, to which an instruction to store the replication data is given, that the storage of the replication data has been completed. If the storage apparatus 100 is a slave node, the notification transmission/reception unit 190 transmits a notification indicating that the own storage apparatus 100 has completed storing the replication data to the master node.

Regarding the data transmitted by the data move unit 140 to the other storage apparatus 100, if the other storage apparatus 100 has notified a write completion to the notification transmission/reception unit 190, the data deletion unit 200 deletes the replication data stored by the own storage apparatus 100. In the present disclosure, the data deletion processing is not indispensable, but it is possible to ensure a free space of the data storage unit by this processing.

Figure 9:
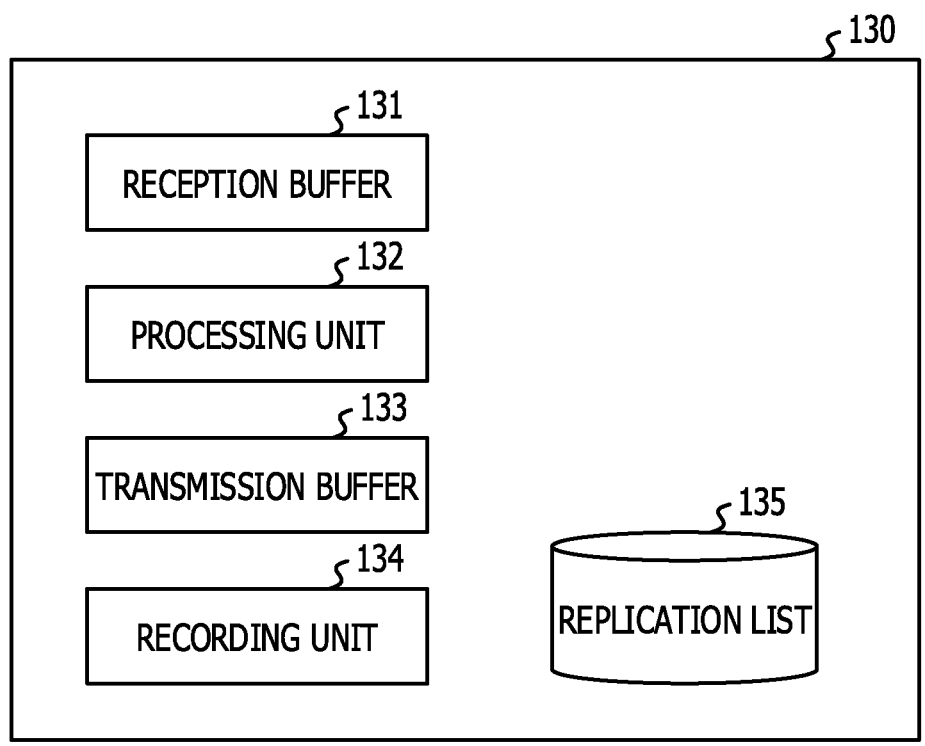
FIG. 9 is a detailed functional block diagram of a replication unit according to the embodiment.

FIG. 9 is a detailed functional block diagram of the replication unit 130 illustrated in FIG. 8. The replication unit 130 includes a reception buffer 131, a processing unit 132, a transmission buffer 133, and a recording unit 134. In this regard, the reception buffer 131 and the transmission buffer 133 may be disposed separately from the processor 101 as a dedicated circuit.

The reception buffer 131 is a holding unit that holds replication data to be transmitted to a storage apparatus 100 to be a slave node in the order received by the replication unit 130. The reception buffer 131, may be a first-in-first-out (FIFO) buffer, for example.

The processing unit 132 takes out replication data held in the reception buffer 131 in sequence, and if a predetermined condition is met, the processing unit 132 performs processing for putting a plurality of replication data together. The plurality of replication data that are put together constitute a single packet having a common destination address.

The transmission buffer 133 is a holding unit for temporarily holding the replication data to be transmitted to another storage apparatus 100. The packet including the plurality of replication data that are put together by the processing unit 132 is held in the transmission buffer 133.

The recording unit 134 creates a replication list 135 at a time when the replication data is transmitted to the storage apparatus 100 to be a slave node. The replication list 135 is a list for recording a corresponding relationship among a replication ID generated for each packet, a transmission destination address of the packet, and replication data included in the packet at a time when the master node transmits a packet including replication data to a slave node. This list is used for recording on which data the replication processing is completed or not. For example, at a time when a packet including replication data is transmitted to a slave node, a replication ID is recorded in the replication list 135, and upon receiving a notification that the slave node completed writing the replication data, the field of the corresponding replication ID is deleted from the replication list 135.

FIG. 10 is an example of the replication list 135. The replication list 135 records a replication ID, a data ID of the data included in the packet, and a transmission destination address in association with one another. For example, in the case of an example illustrated from processing 500 to processing 505 in FIG. 2, the replication list 135 created by the storage apparatus 100A is recorded as illustrated in the first row in the table illustrated in FIG. 10. That is to say, the destination address (B: the address of the storage apparatus 100B), and the data ID (X) are recorded for the replication ID (aa). Also, in the case of an example illustrated from processing 506 to processing 517 in FIG. 2, the replication list 135 created by the storage apparatus 100A is recorded as illustrated in the second row in the table illustrated in FIG. 10. That is to say, a single destination address (B), and data ID (Y, Z) of a plurality of data are recorded for a single replication ID (bb).

Figure 11:
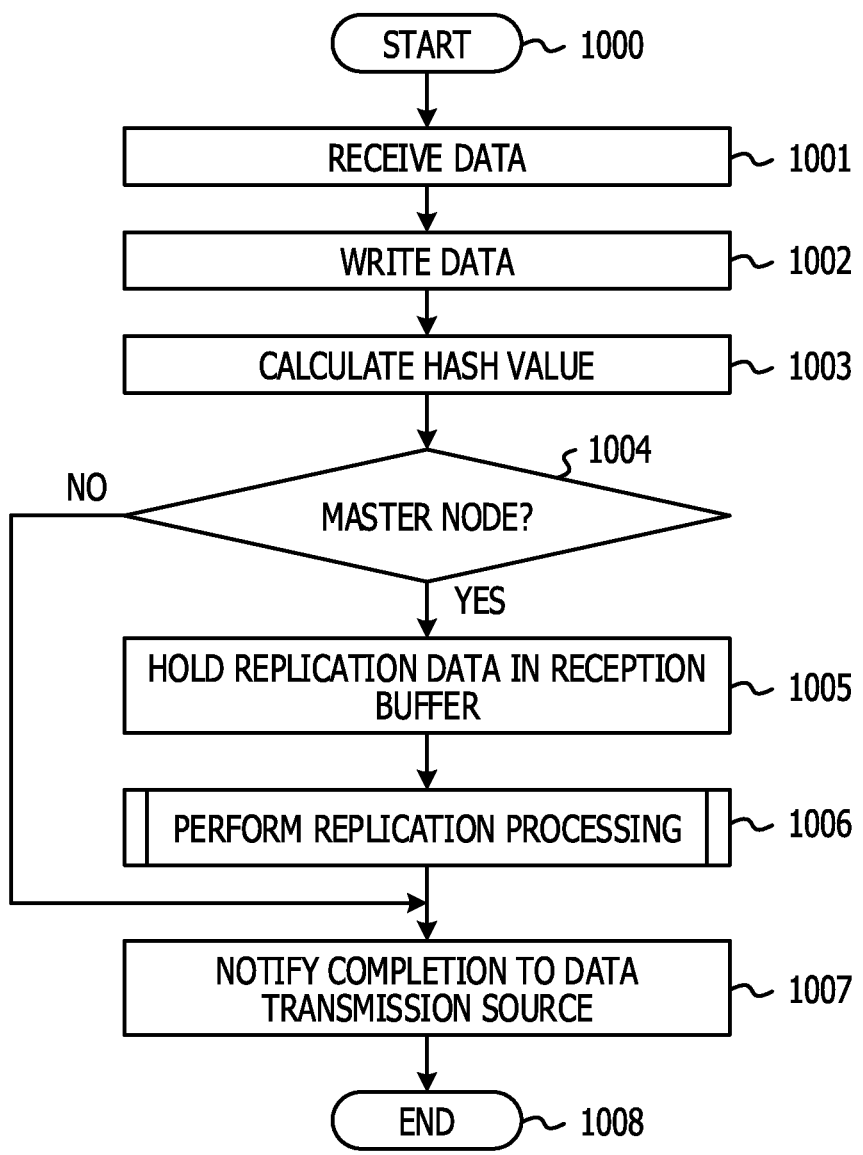
FIG. 11 is a flowchart of replication processing in the storage apparatus according to the embodiment.

Next, a description will be given of the processing flowchart of the storage apparatus 100. FIG. 11 illustrates a processing flowchart of data writing by the storage apparatus 100. The data write processing starts from processing 1000, and in processing 1001, the data transmission/reception unit 110 receives data. In processing 1002, the data write unit 120 writes the received data into its own data storage unit. In processing 1003, the hash value calculation unit 170 calculates a hash value of the data ID attached to the data. In processing 1004, the determination unit 160 determines whether the storage apparatus 100 itself is a master node of the received data or not based on the hash value and the hash value corresponding table 210. In processing 1004, if determined that the storage apparatus 100 itself is the master node, the reception buffer 131 holds the replication data in processing 1005. Then, in processing 1006, the replication unit 130 performs replication processing on the replication data held in the reception buffer 131. After processing 1006, in processing 1007, the notification transmission/reception unit 190 notifies the completion of writing the data to the transmission source of the data, and in processing 1008, the processing is terminated. In processing 1004, if determined that the storage apparatus 100 itself is not the master node, the processing proceeds to processing 1007.

In this regard, the processing 1005 in which the reception buffer 131 holds the replication data may be performed after the received data is stored in the data storage unit, such as the HDD 300, or the like. Also, the processing 1005 may be performed before the received data is stored into the data storage unit, or may be performed at the same time with the processing of storing the data into the data storage unit. Also, the data transmission/reception unit 110 may hold the received data in the reception buffer 131 without change. Also, the data stored into the data storage unit once may be read, and be stored in the reception buffer 131. Further, the storage apparatus 100 may detect that the received data includes an error, and may re-transmit the data, or correct the erroneous data. In this case, after re-transmitting the data, and correcting the erroneous data, the data storage unit may store the data, and the reception buffer 131 may hold the replication data.

Figure 12:
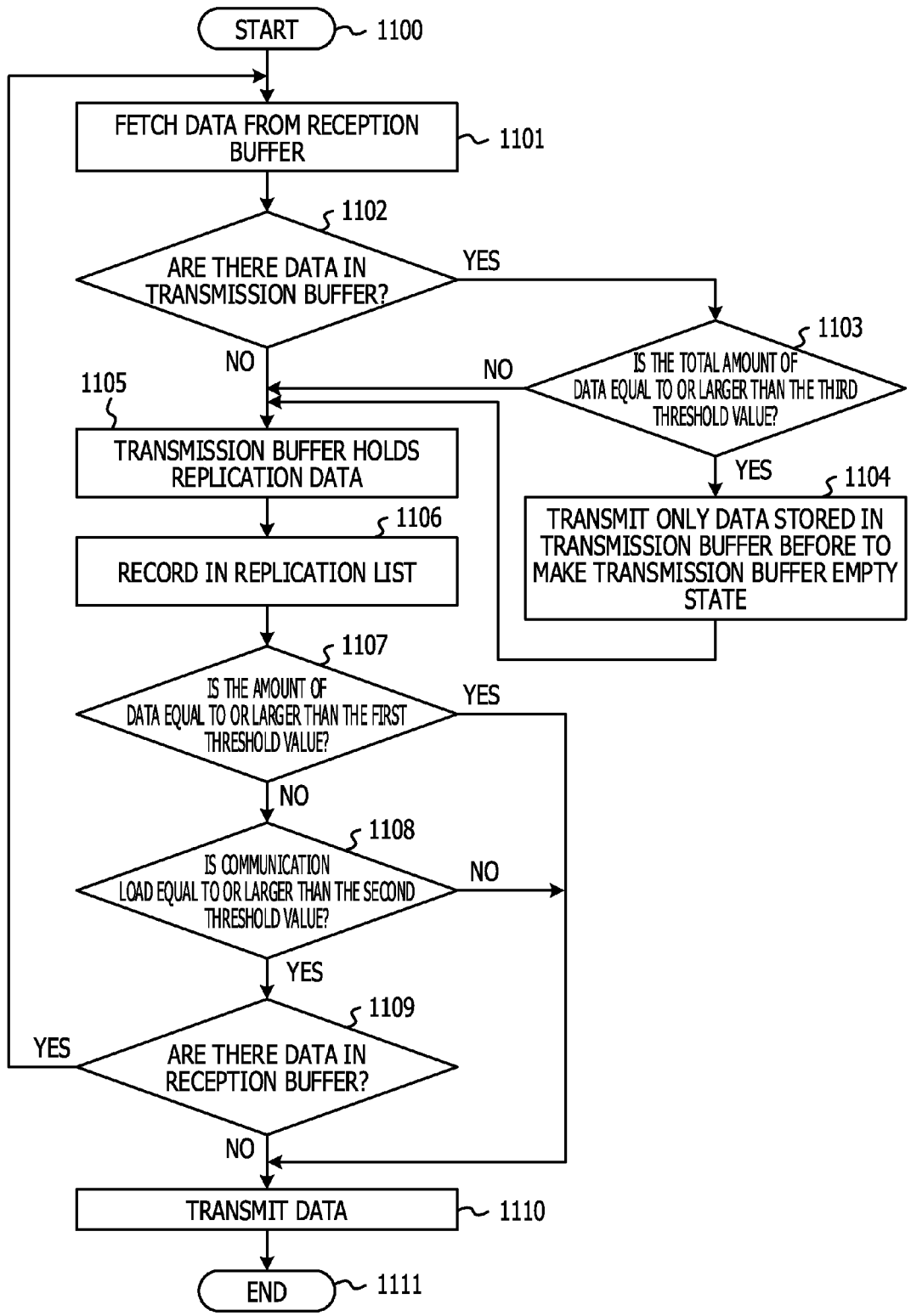
FIG. 12 is a flowchart of write processing in the storage apparatus according to the embodiment.

FIG. 12 is a processing flowchart of the replication by the replication unit 130, which corresponds to details of the processing 1006 in FIG. 11. The replication processing is started from processing 1100. In processing 1101, the processing unit 132 takes out the replication data held in the reception buffer 131. In processing 1102, the processing unit 132 determines whether the transmission buffer 133 has already held the other replication data or not. If the other replication data is not held in the transmission buffer 133, the processing proceeds to processing 1105. If the other replication data is held in the transmission buffer 133, the processing proceeds to processing 1103.

In processing 1105, the transmission buffer 133 holds the replication data. In processing 1106, the recording unit 134 identifies a slave node based on the hash value calculated by the hash value calculation unit 170 and the hash value corresponding table 210, and records a destination address together with a replication ID, and a data ID in the replication list 135. In processing 1107, the determination unit 160 determines whether the amount of data held in the transmission buffer 133 has reached a first threshold value or not. Here, a first threshold value is defined as 80% of the total capacity of the transmission buffer 133, for example. At this point in time, if the amount of data stored in the transmission buffer 133 is larger than the first threshold value, there is a risk of exceeding the capacity of the transmission buffer 133 when the next replication data is put together. Accordingly, if determined that the amount of data held in the transmission buffer 133 is equal to or larger than the first threshold value, the processing proceeds to processing 1110, and transmission of the replication data is performed. In processing 1107, if determined that the amount of data held in the transmission buffer 133 is not larger than the first threshold value, the processing proceeds to processing 1108. In processing 1108, the determination unit 160 determines whether the communication load of the network is equal to or higher than a second threshold value based on the monitoring result of the load monitor unit 180. For example, in the case where the load monitor unit 180 monitors the number of packets communicated per unit time, the second threshold value is a predetermined value of the number of packets. Also, in the case where the load monitor unit 180 monitors time occupied for transmission and reception of the Ping command, the second threshold value is a predetermined value of a time period. In processing 1108, if determined that the communication load is equal to or higher than the second threshold value, the processing proceeds to processing 1109, whereas if determined that the communication load is lower than the second threshold value, the processing proceeds to processing 1110. In processing 1109, the determination unit 160 determines whether there is next replication data held in the reception buffer 131 or not. If determined that there is not the next replication data, the processing proceeds to processing 1110, whereas if determined that there is the next replication data, the processing returns to processing 1101. In processing 1110, the processing unit 132 adds a header including a destination address recorded in the replication list 135 to the replication data held in the transmission buffer 133 to create a packet, and transmits the packet to the storage apparatus 100 to be a slave node.

Next, a description will be given of processing 1102 when determined that the other replication data is already held in the transmission buffer 133. In processing 1103, the determination unit 160 determines whether the total amount of the replication data already held in the transmission buffer 133, and the newly fetched replication data from the reception buffer 131 this time is larger than a third threshold value or not. Here, the third threshold value may be set to 80% of the total capacity of the transmission buffer 133 (the same value as the first threshold value), for example, or may be set to a higher value than the first threshold value, for example, the same value as the total capacity value of the transmission buffer 133. In the case where the third threshold value is set to the same value as the total capacity value of the transmission buffer 133, it is possible to determine whether the data overflows the transmission buffer 133 by adding the data newly fetched from the reception buffer 131 to the data already stored in the transmission buffer. In processing 1103, if determined that the total amount of data of the replication data is less than the third threshold value, the processing proceeds to processing 1105, whereas if determined that the total amount of data of the replication data is not less than the third threshold value, the processing proceeds to processing 1104. If the processing proceeds to processing 1105, in processing 1105, the transmission buffer 133 holds a plurality of pieces of replication data. On the other hand, if the processing proceeds to processing 1104, the processing unit 132 does not input the replication data newly fetched from the reception buffer 131 into the transmission buffer 133, and transmits the replication data that has been stored in the transmission buffer 133 before. Thereby, the transmission buffer 133 becomes an empty state. Then, the processing proceeds to processing 1105, and the transmission buffer 133 holds the replication data newly fetched from the reception buffer 131.

Next, a description will be given of processing of the data move unit 140 in the case where the replication data of the packet received by the storage apparatus 100 partly includes replication data having a storage apparatus 100 other than the own storage apparatus 100 as a right slave node.

The storage apparatus 100 first stores the replication data received from a master node into the own data storage unit, and then reads the data ID added to the data stored in the data storage unit, and calculates a hash value of the data ID. It is possible to determine whether the data stored in the data storage unit is data to be originally stored in another storage apparatus 100 as a slave node by referencing the hash value corresponding table 210 based on the hash value. For the data to be stored into another storage apparatus 100 as a slave node, the storage apparatus 100 transmits that data to the other storage apparatus 100.

Figure 13:
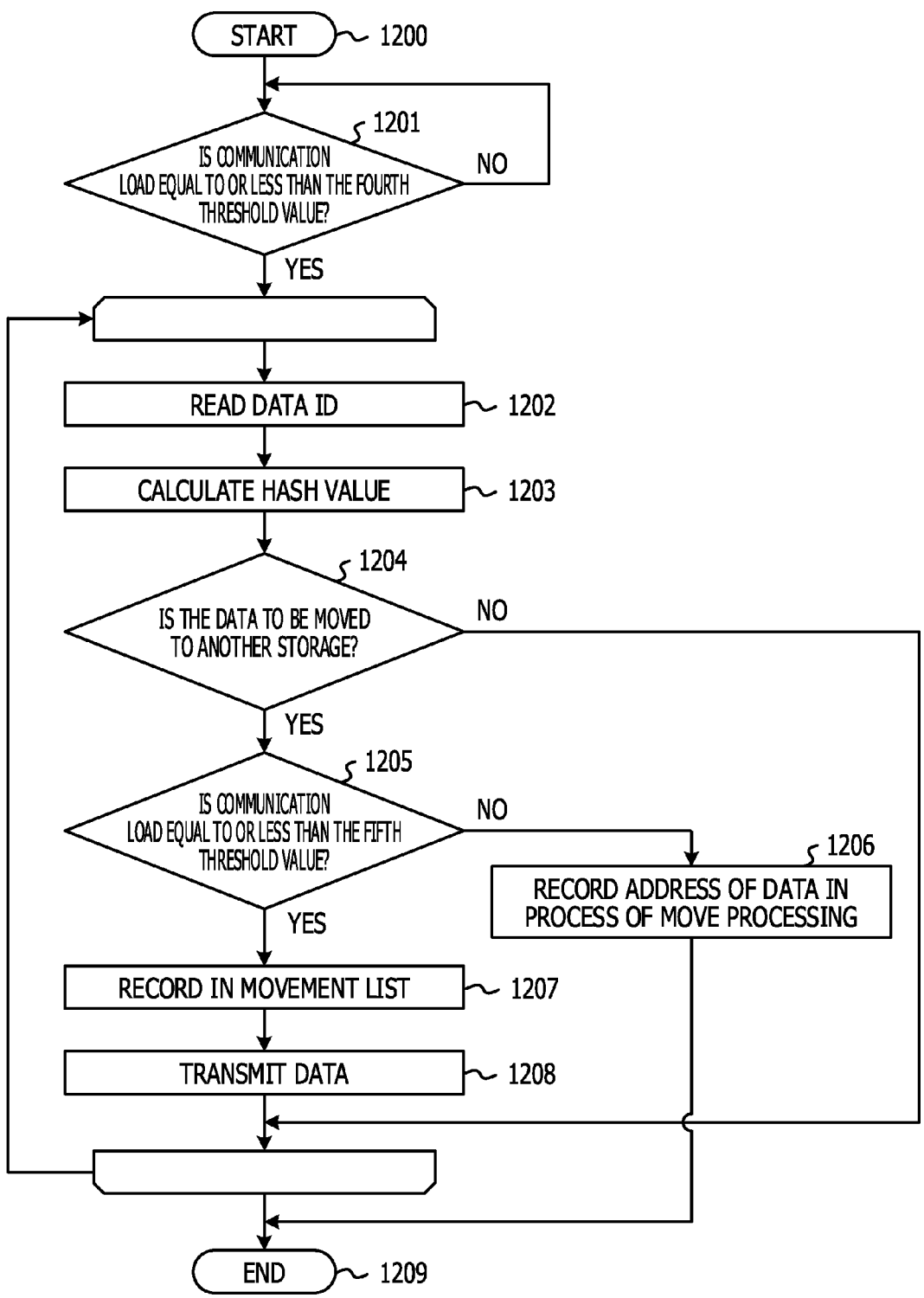
FIG. 13 a flowchart of data move processing in the storage apparatus according to the embodiment.

FIG. 13 is a processing flowchart for moving replication data to another storage apparatus 100. The move processing is started from processing 1200. In processing 1201, the determination unit 160 determines whether the communication load of the network monitored by the load monitor unit 180 is equal to or less than a fourth threshold value. The fourth threshold value may be the same value as the second threshold value used in processing 1108 in FIG. 12. In processing 1201, if the communication load of the network is higher than the fourth threshold value, processing 1201 is repeated until the communication load becomes equal to or less than the fourth threshold value. In processing 1201, if determined that the communication load becomes equal to or less than the fourth threshold value, in processing 1202, the data move unit 140 reads the data ID attached to the data stored in the address of a specific address and the subsequent addresses among the data stored in the data storage unit. In processing 1203, the hash value calculation unit 170 calculates a hash value of the data ID. In processing 1204, the determination unit 160 refers to the hash value corresponding table 210 based on the calculated hash value so as to determine whether the data is the replication data to be stored into another storage apparatus 100 or not. In processing 1204, if determined that the data is not the replication data to be stored into another storage apparatus 100, the determination unit 160 calculates a hash value of the data ID of the other data in the same manner by the loop processing. On the other hand, in processing 1204, if determined that the data is the replication data to be stored into another storage apparatus 100, in processing 1205, the determination unit 160 determines whether the communication load of the network is equal to or lower than a fifth threshold value or not. The fifth threshold value may be the same value as the fourth threshold value used in processing 1201. In processing 1201, a determination of the communication load was performed, but it is thought that the communication load might increase after that. In such a case, a determination of the communication load is performed again in processing 1205 in order to stop transmission of data. In processing 1205, if determined that the communication load is higher than the fifth threshold value, the processing proceeds to processing 1206. In processing 1206, the address of the data in process of the processing is recorded, and the data move processing is terminated in processing 1209. It is possible to use the address of the replication data on which the move processing has been suspended for determining from which address of the data the data move processing is restarted at a time when the communication load becomes lower than the threshold value next. In this regard, if it is difficult to perform management using an address, a time when data is written is recorded, and up to which data the move processing has been completed may be managed in association with the time when the data was stored. Also, these methods of management may not be carried out, and a determination may be made all the time as to whether movement has to be performed for all the data.

In processing 1205, if determined that the communication load is equal to or lower than the fifth threshold value, a move ID is attached to the data ID of the data to be moved, and is recorded in the movement list together with the move destination address of the data. In processing 1208, the data move unit 140 transmits the replication data to a predetermined storage apparatus 100, and repeats the same processing on the other data by the loop processing.

FIG. 14 is an example of the movement list created by the data move unit 140. In the movement list, a move processing ID, a destination address, and a data ID are recorded in association with one another for each replication data to be moved. For example, in the example in FIG. 2, in order to move the replication data of the data Z from the storage apparatus 100B to the storage apparatus 100C, the storage apparatus 100B records, for example the move processing ID as "pp", the move destination address as "C (the address of the storage apparatus 100C)", and the data ID as "Z". After the data is transmitted to another storage apparatus 100, the data movement list is used at a time when a completion notification of the data storage is received from another storage apparatus 100. For example, after the storage apparatus 100B transfers the replication data to the storage apparatus 100C, the notification transmission/reception unit 190 receives a data write completion notification from the storage apparatus 100C. Then, which move data ID of the data has been stored is recognized. The data deletion unit 200 identifies a data ID corresponding to the move data ID whose data writing completion is notified by referencing the move processing list. Then, the data deletion unit 200 deletes the data identified by the data ID from the data storage unit. Thereby, it is possible to reserve a free space of the data storage unit.

Figure 15:
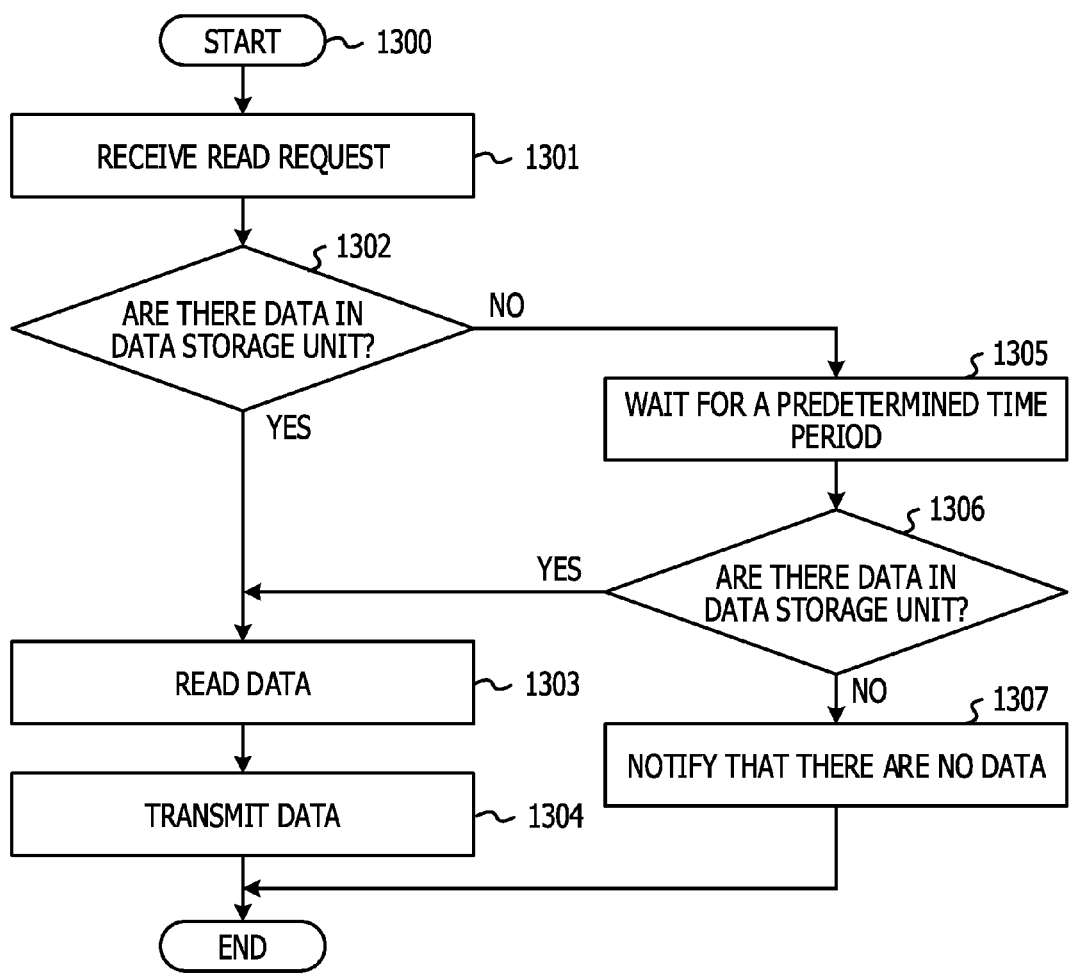
FIG. 15 is a flowchart of data read processing in the storage apparatus according to the embodiment.

Next, a description will be given of processing at a time when the terminal apparatus 3 issued a data read request to the storage system 1. FIG. 15 is a processing flowchart of the storage apparatus 100 on data read processing. The read processing is started from processing 1300. In processing 1301, the request reception unit 150 receives the read request transmitted from the terminal apparatus 3 through the relay server 10. In processing 1302, the data read unit 125 determines whether the target data of the requested data ID is stored in the data storage unit or not. In processing 1302, if determined that the target data is stored in the data storage unit, the processing proceeds to processing 1303, whereas if determined that the target data is not stored in the data storage unit, the processing proceeds to processing 1305. In processing 1303, the data read unit 125 reads the target data. In processing 1304, the data transmission/reception unit 110 transmits the read data to the terminal apparatus 3.

In processing 1302, if determined that the data requested to be read is not stored in the data storage unit, the data read unit 125 waits for a predetermined time period in processing 1305. Then, after an elapse of a predetermined time period, in processing 1306, the data storage unit determines again whether data is stored in the data storage unit or not. This is because in consideration of the case where replication data has not been moved from another storage apparatus 100, the data read unit 125 waits for a predetermined time period, and then accesses the data storage unit again. In processing 1306, if determined that data is stored, in processing 1303 and in processing 1304, data read and data transmission are performed. Also, if the data is not stored in processing 1306, the processing proceeds to processing 1307. In processing 1307, the notification transmission/reception unit 190 notifies that the requested data is not stored to the terminal apparatus 3. In this regard, in place of processing 1307, or in addition to processing 1307, a hash value may be calculated based on the data ID, and processing to transfer the read request to another storage apparatus 100 having a possibility of storing the data may be performed.

In the present embodiment, in a state of a heavy network communication load, transmission of replication data between the storage apparatuses 100 is carried out together so that the number of packets to be transmitted is reduced in order to reduce the network load. Also, at timing when the network load becomes low, replication data is moved to a suitable storage apparatus 100 so that it makes possible to read the data. In this manner, it is possible to enhance the convenience of replication while the network load is decentralized in time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of storing data using a first storage apparatus, a second storage apparatus, and a third storage apparatus coupled with each other through a network, the method comprising:
receiving, by the first storage apparatus, a write request of first data having a destination of the second storage apparatus and second data having a destination of the third storage apparatus from a terminal apparatus coupled to the first storage apparatus via the network;
writing the first data and the second data into the first storage apparatus in response to the write request;
generating first replication data by replicating the first data;
generating second replication data by replicating the second data;
transmitting a packet including the first replication data and the second replication data to the second storage apparatus, when an amount of data stored in a transmission buffer of the first storage apparatus is not equal to or more than a first threshold value which is determined based on a total capacity of the transmission buffer and when a communication load of the network is equal to or more than a second threshold value;
writing, by the second storage apparatus, the first replication data and the second replication data into the second storage apparatus when the packet is received;
generating third replication data by replicating the second replication data; and
transmitting the third replication data from the second storage apparatus to the third storage apparatus; and
transmitting, by the first storage apparatus, a packet including only the first replication data among the first replication data and the second replication data, when the amount of data is equal to or higher than the first threshold value.

2. The method according to claim 1, wherein
the transmitting of the third replication data includes transmitting the third replication data when a communication load of the network is equal to or less than the second threshold value.

3. The method according to claim 1, further comprising:
transmitting, by the second storage apparatus, a first completion notification to the first storage apparatus when the writing of the first replication data and the second replication data is completed; and transmitting, by the first storage apparatus, a second completion notification to a terminal apparatus that issued the write request, when the first completion notification is received.

4. The method according to claim 3, further comprising:
recording, by the first storage apparatus, a first corresponding relationship between the first replication data and a destination address of the first replication data, and a second corresponding relationship between the second replication data and a destination address of the second replication data, in a replication list stored in the first storage apparatus, when the first storage apparatus transmits the first replication data and the second replication data to the second storage apparatus; and
deleting the first corresponding relationship and the second corresponding relationship from the replication list, when the first completion notification is received from the second storage apparatus.

5. The method according to claim 1, further comprising:
writing, by the third storage apparatus, the third replication data into the third storage apparatus when the third replication data is received;
transmitting a third completion notification to the second storage apparatus when the writing of the third replication data is completed; and
deleting, by the second storage apparatus, the second replication data, when the third completion notification is received.

6. The method according to claim 1, wherein
destinations of the first data and the second data are determined based on a first data ID attached to the first data, and a second data ID attached to the second data, respectively, and the second storage apparatus is configured to recognize the second data as data to be addressed to the third storage apparatus based on the data ID of the second data.

7. The method according to claim 1, wherein
the communication load of the network is determined based on a number of packets transmitted on the network per unit time.

8. The method according to claim 1,
wherein the communication load of the network is determined based on time occupied for transmission and reception of a Ping command between the second storage apparatus and the third storage apparatus.

9. The method according to claim 1, further comprising
transmitting the packet including only the first replication data among the first replication data and the second replication data, when the amount of data is not equal to or more than the first threshold and when the communication load of the network is not equal to or more than the second threshold value.

10. The method according to claim 9, further comprising:
storing the first replication data and the second replication data, when it is determined that the another replication data is not stored in the transmission buffer.

11. The method according to claim 1, further comprising:
determining whether another replication data is stored in the transmission buffer, and
determining whether a total amount of the another replication data is equal to or more than a third threshold value, when it is determined that the another replication data is stored in the transmission buffer, transmitting the another replication data, when it is determined that the total amount of the another replication data is equal to or more than the third threshold value, and storing the first replication data and the second replication data after the transmission buffer becomes empty by the transmitting.

12. A storage system comprising:
a first storage apparatus configured to:
  receive a write request of first data having a destination of a second storage apparatus and second data having a destination of a third storage apparatus from a terminal apparatus coupled to the first storage apparatus via the network;
  write the first data and the second data into the first storage apparatus in response to the write request;
  generate first replication data by replicating the first data;
  generate second replication data by replicating the second data; and
  transmit a packet including the first replication data and the second replication data to the second storage apparatus, when an amount of data stored in a transmission buffer of the first storage apparatus is not equal to or more than a first threshold which is determined based on a total capacity of the transmission buffer and when a communication load of the network is equal to or more than a second threshold, and
the second storage apparatus configured to:
  write the first replication data and the second replication data into the second storage apparatus when the packet is received;
  generate third replication data by replicating the second replication data; and
  transmit the third replication data received from the second storage apparatus to the third storage apparatus, and
the first storage apparatus configured to
  transmit a packet including only the first replication data among the first replication data and the second replication data, when the amount of data is equal to or higher than the first threshold value.

13. The storage system according to claim 12, wherein
the second storage apparatus is configured to transmit a first completion notification to the first storage apparatus when the writing of the first replication data and the second replication data is completed, and
the first storage apparatus is configured to transmit a second completion notification to a terminal apparatus that issued the write request, when the first completion notification is received.

14. The storage system according to claim 12, wherein
the third storage apparatus is configured to:
  write the third replication data into the third storage apparatus when the third replication data is received, and
  transmit a third completion notification to the second storage apparatus when the writing of the third replication data is completed, and
the second storage apparatus is configured to
  delete the second replication data, when the third completion notification is received.

15. The storage system according to claim 12,
wherein destinations of the first data and the second data are determined based on a first data ID attached to the first data, and a second data ID attached to the second data, respectively, and the second storage apparatus is configured to recognize the second data as data to be addressed to the third storage apparatus based on the data ID of the second data.

16. The storage system according to claim 12, wherein the communication load of the network is determined based on a number of packets transmitted on the network per unit time.

17. The storage system according to claim 12, wherein the communication load of the network is determined based on time occupied for transmission and reception of a Ping command between the second storage apparatus and the third storage apparatus.

18. A storage apparatus coupled with a first storage apparatus and another storage apparatus, the storage apparatus comprising:
a memory; and
at least one processor coupled to the memory and configured to:
receive, from the first storage apparatus, a packet including a first replication data and a second replication data respectively generated by the first storage apparatus, the first replication data being generated by replicating first data having a destination of the storage apparatus, the second replication data being generated by replicating second data having a destination of the another storage apparatus, the packet being transmitted by the first storage apparatus when an amount of data stored in a transmission buffer of the first storage apparatus is not equal to or more than a first threshold value which is determined based on a total capacity of the transmission buffer and when a communication load of the network is equal to or more than a second threshold value,
write the first replication data and the second replication data into the memory,
generate third replication data by replicating the second replication data, and
transmit the third replication data to the another storage apparatus,
wherein the first storage apparatus is configured to transmit a packet including only the first replication data among the first replication data and the second replication data, when the amount of data is equal to or higher than the first threshold value.

19. The storage apparatus according to claim 18, wherein the processor is configured to transmit the third replication data to the another storage apparatus when a communication load of the network is equal to or less than a second threshold value.

20. The storage apparatus according to claim 18, wherein the processor is configured to delete the second replication data , when a completion notification, indicating that writing of the third replication data into the another storage apparatus is completed, is received from the another storage apparatus.

* * * * *